United States Patent [19]
Marquis et al.

[11] 3,835,215
[45] Sept. 10, 1974

[54] MANUFACTURE OF PHOSPHORIC ACID

[75] Inventors: Byron Marquis, Old Greenwich, Conn.; Robert Somerville, Neshanic, N.J.

[73] Assignee: Singmaster & Breyer, New York, N.Y.

[22] Filed: Sept. 18, 1972

[21] Appl. No.: 289,795

Related U.S. Application Data
[63] Continuation of Ser. No. 812,648, April 2, 1969, abandoned.

[52] U.S. Cl. .............................. 423/167, 423/320
[51] Int. Cl. ......... C01f 1/00, C22b 3/00, C01f 5/00, C01f 11/00, C22b 29/00
[58] Field of Search..................... 423/166, 167, 320

[56] References Cited
UNITED STATES PATENTS
2,807,521  9/1957  Lambe et al......................... 423/166
3,257,168  6/1966  Chelminski.......................... 423/320

FOREIGN PATENTS OR APPLICATIONS
164,898  8/1955  Australia............................. 423/320

Primary Examiner—Oscar R. Vertiz
Assistant Examiner—Gregory A. Heller
Attorney, Agent, or Firm—Curtis, Morris & Safford

[57] ABSTRACT

A process for producing phosphoric acid from phosphate ore by multi-stage digestion of disintegrated ore with sulfuric acid and phosphoric acid, is shown. The sulfuric acid is added to weak phosphoric acid recycled in the process and the mixture is cooled in a first vacuum cooler before it enters the rock digestion zone. Conditions are maintained which favor formation of large rhombic crystals of gypsum over other forms of calcium sulfate. The slurry formed is circulated to maintain a substantially uniform temperature with less than 5°C temperature drop at the surface of a second evaporation cooler. The formed crystals are separated and washed and at least a part of the resulting weak phosphoric acid is recycled.

1 Claim, 3 Drawing Figures

INVENTORS
BYRON MARQUIS
ROBERT L. SOMERVILLE
BY
Curtis, Morris Safford
ATTORNEYS

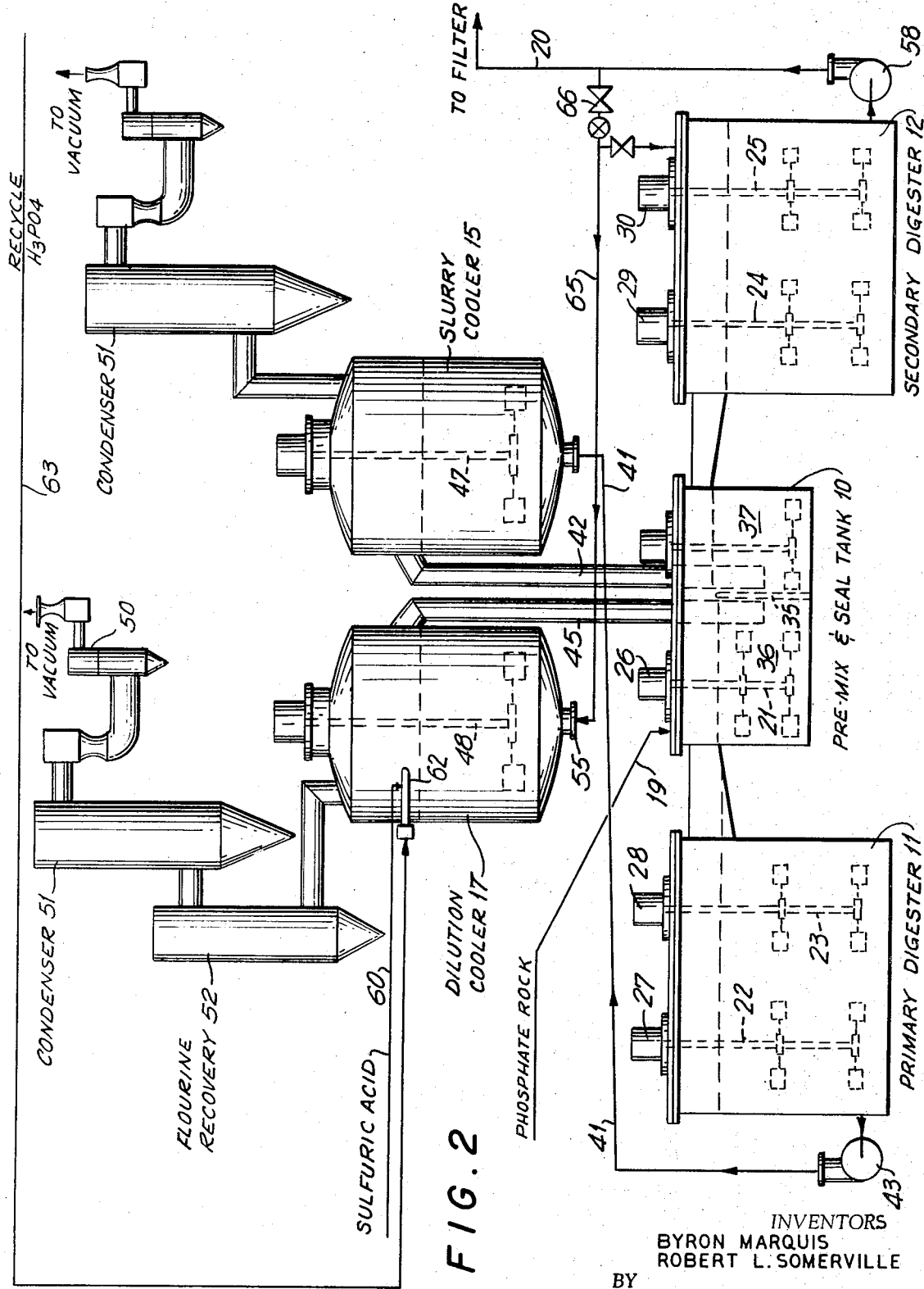

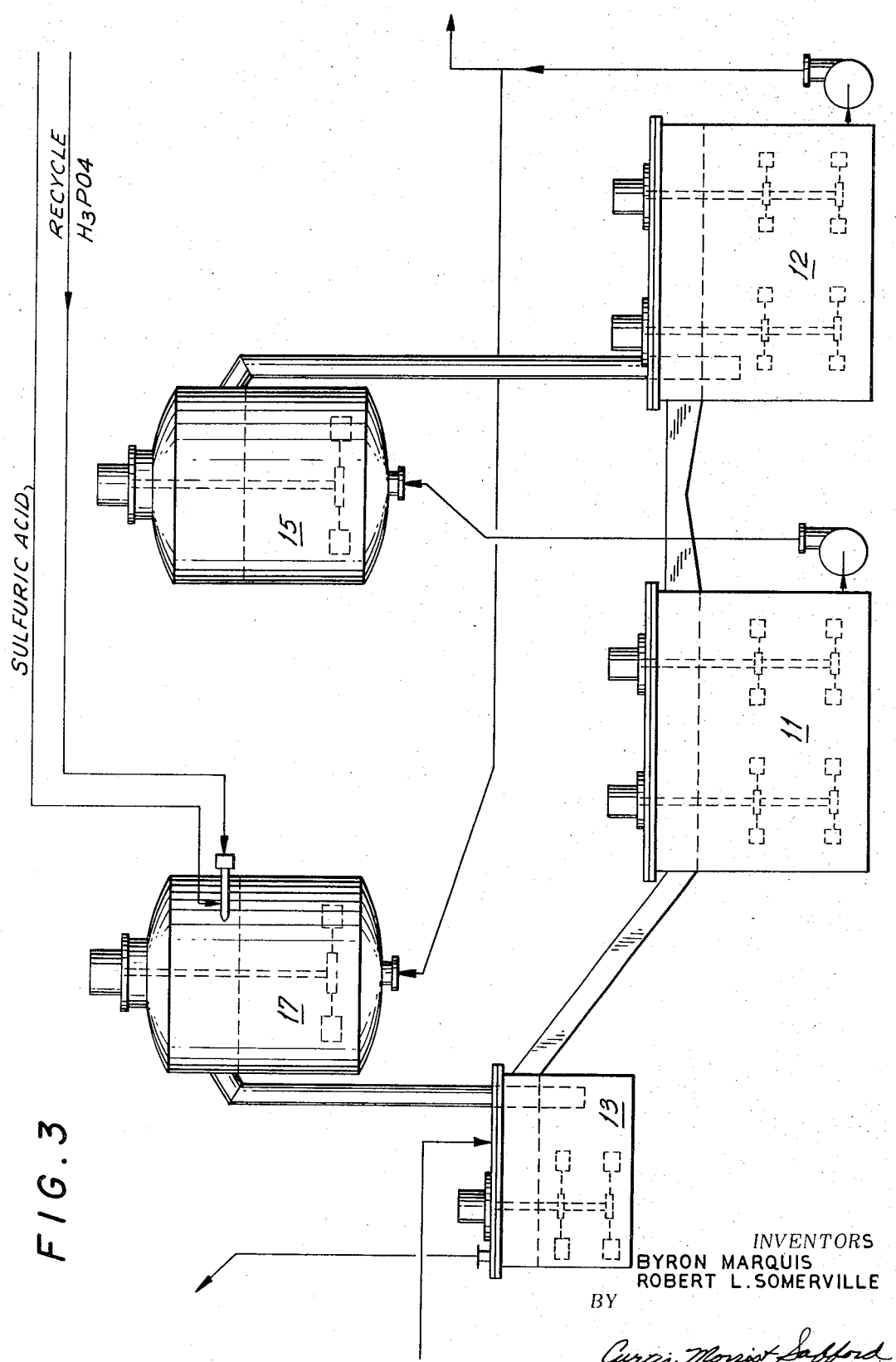

MANUFACTURE OF PHOSPHORIC ACID

This is a continuation of application Ser. No. 812,648, filed Apr. 2, 1969 and now abandoned.

This invention relates to the manufacture of phosphoric acid as by the acidulation of phosphate rock and, more particularly, to processes therefor in which the size and structure of gypsum crystals formed are better controlled for more ready filtration and an enhanced product, while also minimizing conventional losses of $P_2O_5$ as water-insoluble and citrate-soluble materials routinely experienced in phosphate acidulation processes.

As will be well understood, the manufacture of phosphoric acid by processes generally of the character to which this invention relates involves the treatment or digestion of phosphate rock with sulfuric acid and weak phosphoric acid to form a slurry of various calcium sulfates in phosphoric acid, and with final separation of the crystalline sulfate components from the phosphoric acid by filtering on, usually, vacuum filters of one type or another. Substantial amounts of heats of dilution and reaction occur during the digestion steps of the process, and temperature control of these various steps is of substantial significance in attempting to control the type and size of sulfate crystals formed, which factors are quite important from the standpoint of efficient operation and economic yield because of the well understood influence which the type and size of sulfate crystals bears upon the ease of final filtration thereof from the product slurry as well as the amount of useable water-insoluble $P_2O_5$ entrapped or co-crystallized in the crystals.

Furthermore, as also will be understood, various attempts either to control or minimize temperatures and sharp variations thereof or to control the size and type of sulfate crystals formed may be complicated or frustrated by the marked scale-forming characteristics of some of the precipitating products, especially if in the form of calcium sulfate or gypsum, cemented into a hard scale by silico fluorides. Similarly, localized high temperatures (such as adjacent the point of introduction of reactants into the various steps of the processes) and/or localized high concentrations of sulfuric acid adjacent the point of introduction thereof may also tend to produce the undesired anhydrite or hemihydrate crystal form and/or to produce many small gypsum nuclei which tend to give many very fine crystals which are undesirable, especially from the filtration point of view.

Under certain conditions, particularly lack of uniform and adequate control of the sulfuric acid concentrations as well as the reaction temperatures, substantial amounts of dicalcium phosphate are entrapped and co-crystallized in the gypsum crystal lattice, resulting in the loss in the gypsum tailings of water-insoluble but citrate-soluble $P_2O_5$, thus reducing the ultimate yield of desired phosphate production. In attempting to alleviate any of the foregoing difficulties, of course, it is also recognized that concentrations of the ingredients are to be maintained as high as practicable, so that the quantities of water utilized to wash the filter cake must be limited to obtain a desired concentration of phosphoric acid product.

According to this invention, however, such phosphate acidulation processes are designed for minimizing scale formation and controlling gypsum crystal formation to be predominantly, or entirely, in the large rhombic crystal form of the dihydrate, instead of other various crystal forms, such as agglomerates of needle-shaped crystals, while also minimizing or removing localized effects of excessive concentrations and/or heats of dilution or reaction; and controlling conditions so that any dicalcium phosphate in the gypsum crystal lattice will revert before the separation of gypsum from the mother liquor.

For implementing such ends, multi-stage digestion techniques are utilized, with specialized vacuum cooling between the stages to maintain separate a high temperature and a lower temperature digesting steps, while the sulfuric acid reactant is diluted with recycled phosphoric acid and the resulting heat of dilution removed prior to admixture into the first digestion stage with some recycled slurry also being added to the dilution-cooling step for additional control of crystal formation.

With the foregoing and additional objects in view, this invention will now be described in more detail, and other objects and advantages thereof will be apparent from the following description, the accompanying drawings, and the appended claims.

In the drawing:

FIG. 2 is a similarly diagrammatic or flow sheet representation of a further embodiment of this invention in which product slurry is recycled to the preliminary dilution and cooling step; and FIG. 3 is a flow sheet representation of a process of the invention adapted for uncalcined phosphate rock.

Figure 1:
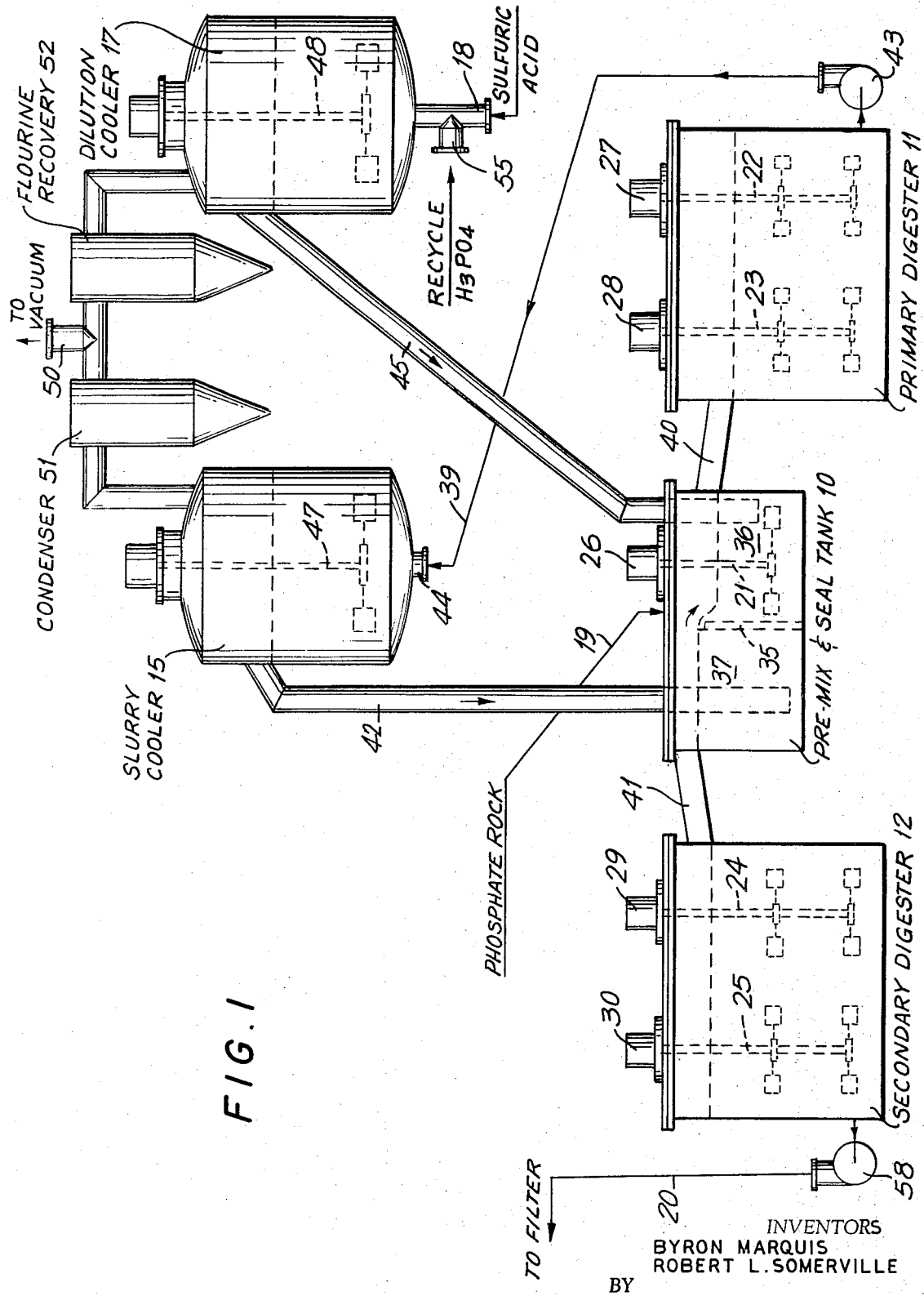
FIG. 1 is a somewhat diagrammatic or flow sheet type of representation of the steps and apparatus embodying and for practicing this invention in a phosphoric acid process with preliminary dilution and cooling of the sulfuric acid reactant.

The particular phosphate acidulation processes described here as illustrative embodiments for the application of this invention are generally of the type disclosed in the U.S. Pat. No. 3,257,168 issued June 21, 1966 and the U.S. Application Ser. No. 708,420 filed Feb. 26, 1968 as comprising two digesting steps with vacuum cooling of the slurry between the two steps, and reference generally to the disclosure of this patent and this application is here made for further explanation of some of the operational and constructional details of illustrative embodiments. Thus, referring to the drawings, in which like reference characters refer to like parts throughout the several views thereof, there is indicated in FIG. 1 a premixing and seal tank 10, described in more detail hereafter, and primary and secondary digesters 11 and 12 through which the reacting slurry is successively fed and circulated. A vacuum cooler 15 is interposed in the line of flow between the primary and secondary digesters 11 and 12, while a similar type of vacuum cooler 17 is provided for treatment and cooling of the sulfuric acid solution after dilution thereof and before it enters the process at inlet 18 of cooler 17. The phosphate rock to be acidulated is introduced at 19 into premix tank 10, and the finished product slurry leaves the digesting steps of the process through line 20 to conventional vacuum filtering steps. Alternatively, the seal tank may be omitted and the slurries from the vacuum coolers may be introduced directly into the respective digesters, and the phosphate rock introduced directly into the primary digester.

Primary and secondary digesters 11 and 12, as well as premix and seal tank 10, are of conventional design, or as disclosed in the above-mentioned patent and application, preferably include mechanical agitators, as indicated at 21–25, inclusive, driven by motors 26–30.

Premix and seal tank 10 is divided into two chambers by an internal partition 35 forming a weir, with the righthand side 36 being a premix chamber for receiving reactants prior to the introduction thereof into primary digester 11, and with the left-hand side 37 forming a sealing chamber for receiving through pipe 42, cooled slurry from cooler 15 for introduction into a secondary digester 12.

A conduit 40 connects premix chamber 36 with primary digester 11, while conduit 41 connects the sealing chamber 37 in tank 10 with secondary digester 12. As indicated on the drawings, conduit 40 is at a somewhat lower level than conduit 41 at tank 10 and with respect to the height of weir 35 therein, so that a portion of the cooled slurry from sealing chamber 37 may overflow weir 35 and be intermixed with the slurry in premix chamber 36, while the balance of material entering sealing chamber 37 flows out through conduit 41 into secondary digester 12.

Sealing chamber 37 in tank 10 forms a seal around the lower portion of a barometric leg 42 from slurry cooler 15. Hot slurry from primary digester 11 is introduced into cooler 15 through line 39 under the action of pump 43. A similar barometric leg 45 leads overflow liquid from dilution cooler 17 into the premix chamber 36 of tank 10 for admixture therein with pulverized phosphate rock entering chamber 36 at 19.

As will be apparent from the following description, the material to be fed into both vacuum coolers 15 and 17 either contains sulfate and silico fluoride precipitates or may readily form them upon substantial reduction in temperature encountered in the vacuum cooler. If such substantial temperature decrease had been achieved in the vacuum cooler apparatus constructed in accordance with conventional designs, the temperature decrease itself would cause substantial precipitation and scaling on the cooler surfaces, and such precipitates as did not form scale would mainly be in the form of small, rapidly formed, crystals which are difficult to filter. Accordingly, in the present invention, both coolers 15 and 17 are advantageously of the type disclosed in the above-mentioned co-pending applications and include agitators 47 and 48 or other means for constantly recirculating a large mass of liquid in the coolers; and the volume of the coolers is correlated with the height of the overflows into barometric legs 42 and 45 so that there is a substantial holding time of liquid within the coolers with continual and rapid recirculation thereof.

Vacuum is maintained above the liquid level in coolers 15 and 17 (as by vacuum line 50 with, preferably, condensers and conventional associated equipment such as 51 and fluorine recovery equipment 52) so that vacuum cooling of liquid in coolers 15 and 17 occurs at the surface of the liquid level therein. Yet the volume of the coolers and the capacity of agitators 47 and 48 therein are all correlated to maintain a circulation rate within the coolers substantially in excess of the rate at which hot slurry enters the bottoms of the coolers. Thus, a substantial or preponderant part of the cooling of the hot slurry entering the coolers is accomplished by admixture and direct heat exchange with cooler slurry already present in the cooler by constant circulation and mixing of the liquid materials therein so that only a slight temperature drop (e.g., less than 5°F.) occurs by evaporation of any particular increment of the mixed slurry, and this takes place at the liquid surface within the coolers. Also, the liquid at this surface and subject to evaporation and cooling is constantly changing through recirculation so that a large total amount of heat is removed to accomplish the entire temperature decrease desired.

For example, if a hot slurry at a temperature of about 180°F. is delivered into cooler 15, having a capacity of 4,500 gallons, through inlet 41 at the rate of about 1130 gallons per minute (as one might expect of a plant scaled to produce $P_2O_5$ at the rate of 100 tons per day), cooling the slurry down to 160°F. would require removing about 10 million B.T.U. per hour. According to conventional flash-cooling or vacuum cooling techniques, such an amount of heat removal would be expected to produce such drastic or quick temperature drop in the cooling slurry as to cause undesirably rapid precipitation of gypsum and silico fluorides in the form of many small and hard-to-filter crystals as well as scaling by precipitation onto the walls of cooler 15, requiring periodic shutdowns for cleaning, etc.

On the other hand, a cooler designed in accordance herewith, and having an agitator 47 producing a continuous recirculation of slurry to the surface of the liquid in cooler 15 at the rate of about 18,000 gallons per minute, the actual temperature drop for successive small increments of slurry reaching the surface for evaporation therefrom is only about 1.3°F. Similarly, with continual recirculation by agitator 47 of slurry from inlet 41 to the evaporation surface of the liquid in cooler 15 at the rate of 30,000 gallons per minute, as much as 18 million B.T.U. per hour may be removed by evaporation from a slurry having a specific heat of 1.6 and a sensible heat of about 0.6 B.T.U. per pound with an incremental temperature drop at the surface of the slurry of only about 1.25°F. and sufficiently low to avoid inducing undesired rapid precipitation from the evaporating slurry. That is, slow cooling and rapid high volume circulation promote precipitation and crystal growth upon the surface of existing crystals in the slurry, rather than on the walls of cooler 15, and cause growth of existing crystals, rather than forming new precipitation nuclei and many tiny crystals in the precipitating solution to complicate subsequent filtering and washing steps.

In accordance with the foregoing, cooler 15 operates in much the same manner as that disclosed in the aforesaid copending applications, and, although cooler 17 is preferably and substantially the same construction and operation, the provision thereof in the instant embodiment relates to a somewhat different purpose and enhancement of the advantages obtained.

The quality of gypsum crystals precipitated is substantially decreased when there are high local concentrations of sulfuric acid in the digester and high local temperature concentrations. Furthermore, as is well known, if the undigested phosphate rock is exposed to an excessive concentration of sulfuric acid, the rock particles, especially the larger ones, may be coated with calcium sulfate thus inhibiting further dissolution and reaction, and resulting in losses of citrate insoluble $P_2O_5$ with the gypsum tailings. If we were to consider elimination of the first such condition by diluting the sulfuric acid before introducing it into the reaction digester, it would be evident that any considerable quantity of water used for dilution purposes must be deducted from that which can be used for washing at the filters, if excessive dilution of the phosphoric acid product is to be avoided.

If, as in the present process, some phosphoric acid recycled from the filters is used to predilute the sulfuric acid reactant, excessively high or localized acid concentrations are avoided, while the water in the diluent phosphoric acid is only what would normally be returned to the system in any case. Nevertheless, merely recycling weak phosphoric acid as a diluent for the sulfuric acid may not accomplish the entire or optimum advantages here unless the dilution occurs prior to introducing the diluted sulfuric acid into the reaction zone and unless the heat of dilution is somehow removed (as in dilution cooler 17) prior to introducing the reactants into the digester. Similarly, utilizing recycled phosphoric acid filtrate for dilution of concentrated sulfuric acid may produce precipitation of scale-forming calcium sulfate, probably as the anhydrite, as well as resulting in the formation of many small nuclei of calcium sulfate crystals, even prior to entry into the primary digester, thereby further reducing the desired filterabiity of the final gypsum slurry. The utilization of a circulating and crystallizing vacuum cooler 17 of the character described above, however, satisfactorily accomplishes, in accordance herewith, both the prediluting of sulfuric acid to avoid high acid concentration in the digester and removal of the heat from the diluted acid, and all without undesired sulfate precipitation which would be expected to occur with other forms of apparatus or other techniques in which mixing is accomplished without the large volume circulation in cooler 17.

Operation of the process shown diagrammatically in FIG. 1 will be clear from the foregoing. Thus, phosphate rock raw material is introduced at 19 into premix chamber 36 of tank 10 for mixture therein with sulfuric acid diluted with recycled phosphoric acid and with a portion of cooled and reacted slurry overflowing weir 35 from seal chamber 37 in tank 10. Concentrated sulfuric acid (e.g., about 65–98%) is introduced into vacuum cooler 17 through inlet 18 thereof, dilute phosphoric acid (such as recycled wash filtrate from one of the early filtering stages) is introduced into cooler 17 through inlet 55 for dilution by admixture of the sulfuric acid.

A substantial amount of heat of dilution, and reaction, occurs upon the mixture of the concentrated sulfuric acid and weak phosphoric acid (perhaps as much as 50,000 B.T.U. per hour per ton of $P_2O_5$ plant capacity), which heat is removed in cooler 17 during the holding period and admixed liquids are held therein, while, at the same time, avoiding formation of undesired small crystal nuclei because of the low incremental temperature differences in the circulating liquid.

Ordinarily, there is also evolved, as a result of this reaction, substantial quantities of fluorine, routinely present in recycled phosphoric acid. Such fluorine is probably present as fluorosilicic acid in the recycled phosphoric acid, and evolves as silicon tetrafluoride when the recycled phosphoric acid liquor is mixed with strong sulfuric acid. Thus, a further advantage of utilizing the premixing and vacuum cooling technique here is the removal of such fluorine or fluoride components and recovery of a substantial portion of fluorine as a by-product in the condensed vapors from the vacuum cooler 17, e.g., in a suitable condenser such as 52.

After suitable holding time for thorough mixing and cooling of the liquids in cooler 17 (perhaps to a stabilized equilibrium temperature of from about 140° to 165°F.), the thus diluted sulfuric acid reactant is introduced through barometric leg 45 into premixing chamber 36 of tank 10, or directly into the primary digester for admixture therein with the phosphate rock raw material entering at 19. Holding and mixing time in tank 10 is, as will be understood, primarily controlled by flow rate adjustment of the entering materials, with overflow feed thereof through conduit 40 into primary digester 11, where the slurry is agitated for reaction in known manner for the first stage reaction.

From primary digester 11, reacted slurry is pumped by pump 43 through inlet 44 into vacuum cooler 15 at a temperature of, perhaps, 180°F. There the slurry is held and recirculated and cooled down to about 160°F. It eventually overflows through barometric leg 42 into the sealing chamber 37 of tank 10 (or, alternatively, directly into the secondary digester) and is there divided by the overflow arrangement and correlation of the heights of weir 35 and conduit 40 so that a portion of this cooled slurry is returned to premix chamber 35 in tank 10. The remainder passes through conduit 41 into secondary digester 12 where it is held and agitated to complete the second stage of the reaction at a somewhat larger temperature than in primary digester 11. It is then pumped by pump 58 through line 20 to conventional filtering arrangements (usually a tilting pan type filter arranged for countercurrent washing of the cake with water and weak acid filtrates) in known manner and from which filtering steps is withdrawn the first wash filtrate for recycling into cooler 17 thereof.

As will be understood from the foregoing, the utilization of two-stage digestion or reaction, with the intermediate cooling, obtains important advantages by operating primary digester 11 at a relatively high temperature, while secondary digester 12 is maintained at a lower more optimum filtration temperature. Such operation at two different temperature levels also results in substantial reduction in scale-forming precipitation, thus increasing the capacity of the plant by reducing periods of shutdown which have been conventionally necessary for washing and cleaning filters and pipelines. Moreover, the predilution and cooling of the acid reactant in cooler 17 has achieved the advantage of controlling gypsum precipitation into desirably large crystals of the dihydrate instead of the hemi-hydrate or anhydrite.

Referring now to the embodiment of FIG. 2, an arrangement is there shown which includes premix and seal tank 10, primary and secondary digesters 11 and 12, slurry cooler 15, dilution cooler 17, etc., all of which elements are indicated with the same reference numerals as previously described for FIG. 1 and operate and are constructed generally in accordance with the foregoing description.

In the embodiment indicated in FIG. 2, however, the concentrated sulfuric acid is introduced through line 60 into dilution cooler 17, and preferably into a mixing trough 62 located above the slurry level into which the recycle phosphoric acid (first wash filtrate from the typsum filter) is fed through line 63 for the purpose of diluting the sulfuric acid prior to its admixture to the reacting slurry. In this arrangement, the sulfuric acid will be made to impinge upon, and mix with, the No. 2 filtrate or recycle acid just prior to reaching the slurry surface where the agitator will mix the diluted sulfuric acid with slurry coming from the secondary digester. Additionally, in the embodiment of FIG. 2, there is supplied into inlet 55 at the bottom of the dilution cooler 17, e.g., through line 65 controlled by valve 66, a portion of the reacted slurry from secondary digester 12.

In this manner, of course, substantial reaction occurs in dilution cooler 17, but under conditions where the gypsum produced is more readily controlled to form filterable dihydrate crystals. The heat of dilution of the sulfuric acid is almost instantaneously removed, as the acid is mixed with recycle phosphoric acid and poured over the constantly changing liquid surface in cooler 17 and the constantly circulating reservoir of liquid in cooler 17 thus forms a uniform feed material for the primary digester 11.

Actual precipitation of crystals in cooler 17 is minimized because of the constant high volume circulation of slurry therein.

As noted above, vacuum cooler 17 advantageously is operated to maintain a reservoir therein of cooled dilution products at an equilibrium temperature within the range of about 140° to 165° F., from which reservoir diluted sulfuric acid and reacted slurry with appropriately formed crystals are introduced into primary digester 11 for mixture and reaction therein with phosphate rock and cooled slurry introduced from premix chamber 36 of tank 10. Actually, about 2% of the total gypsum produced in the phosphoric acid plant is precipitated in diluting sulfuric acid in cooler 17 and in the form of the desired filterable gypsum crystals, which contributes to the overall performance of the plant.

As noted above, substantial amounts of fluorine may be evolved in dilution cooler 17, and can be easily scrubbed from the vapors leaving the vacuum cooler, e.g., the fluorine recovery apparatus 52.

The recycling of reacted slurry from the secondary digester into dilution cooler 17 subjects such slurry to the environment prevailing in cooler 17, e.g., approximately 140°F., with sulfuric concentration of about 14.4% by weight and $P_2O_5$ concentration of about 23.7% by weight. Under these circumstances, and with a substantial proportion of recycled slurry from the secondary digester 12 into dilution cooler 17, di-calcium phosphate, a certain amount of which is ordinarily co-precipitated with gypsum reverts to phosphoric acid and gypsum, and the amount of water-insoluble and citrate-soluble $P_2O_5$ in the ultimate feed of slurry to the filters through line 20 is substantially reduced. Since this is the major source of $P_2O_5$ losses in such processes, the recycling of the slurry through dilution cooler 17, by minimizing the di-calcium phosphate, aids materially in increasing the yield and efficiency of production of the desired phosphoric acid and gypsum products.

That is, by recycling, reacted slurry from the digester back to an environment of the dilution cooler, where sulfuric acid is at a substantially higher concentration than in the digesters themselves, and thus redissolving the dicalcium phosphate (or water-insoluble $P_2O_5$), one permits its reversion to the desired phosphoric acid and gypsum products. Indeed, such advantages, in accordance herewith, are achieved by recycling a substantial portion of such reacted slurry back to the point of dilution of sulfuric acid and prior to the primary digester, even in installations where special cooling or holding techniques for the dilution of the sulfuric acid are not utilized, especially in the recovery of insoluble $P_2O_5$, although, of course, the added advantages of eliminating heat of dilution are not obtained.

In the embodiment of FIG. 3 the discharge leg from the slurry cooler 15 is sealed directly in the secondary digester 12 into which it discharges while the dilution cooler 17 is sealed and discharges into a separate seal and premix tank (13) into which the phosphate rock is fed and which overflows into the primary digester 11. Tank 13 is vigorously agitated to promote evolution of the gases generated in the reaction such as $CO_2$ and $SiF_4$.

The employment of tank 13 is recommended in cases where uncalcined phosphate rock, containing organic compounds is employed. These organics tend to induce, in the presence of gases evolving from the reaction, the formation of stable foams which are dispersed throughout the volume of the digestion tank. These cause pumps to become gas bound which drastically reduces their capacity.

In the embodiment of FIG. 3 the foaming problem is overcome since most of the gases evolving in the process will be coming off tank 13 which employs no pump while only a small fraction of the total gas evolution will come off the primary digester 11 from which slurry is pumped.

We claim:

1. In a two-stage process for the production of phosphoric acid and gypsum wherein calcium phosphate rock is introduced into and digested in a first digestion zone under conditions conducive to the crystallization of calcium sulfate dihydrate, the slurry therein formed is further reacted, aged and crystallized in a second digestion zone and the gypsum crystals are filtered from their phosphoric acid mother liquor and washed, the improvement which comprises:

a. forming a mixture consisting essentially of phosphoric acid, a mass of gypsum crystals and sulfuric acid in the environment of a first vacuum cooler by combining feed sulfuric acid, recycle weak phosphoric acid from the filtration wash of product crystals and a substantial portion of the slurry, including mother liquor and crystals, formed in said second digestion zone;

b. cooling and circulating the mixture so formed in said first vacuum cooler at a temperature of from 140° to 165°F thereby achieving the formation of multiple, substantially phosphate-free seed crystals of gypsum;

c. introducing the cooled slurry thereby formed to said first digestion zone together with phosphate rock and digesting the phosphate rock therein;

d. introducing the digested slurry formed in said first digestion zone to a second vacuum cooler and cooling said slurry therein;

e. passing the cooled slurry in said second vacuum cooler to said second digestion zone and further reacting, aging and crystallizing the slurry therein;

f. recycling a substantial portion of the slurry formed in said second digestion zone to said first vacuum cooler; and g. separating the balance of slurry formed in said second digestion zone into product phosphoric acid, gypsum crystals and recycle phosphoric acid.

* * * * *